Sept. 10, 1957  E. A. WILLIS, JR  2,805,898
FLUID CURRENT CONVEYOR FOR FRAGILE ARTICLES
Filed Jan. 18, 1955
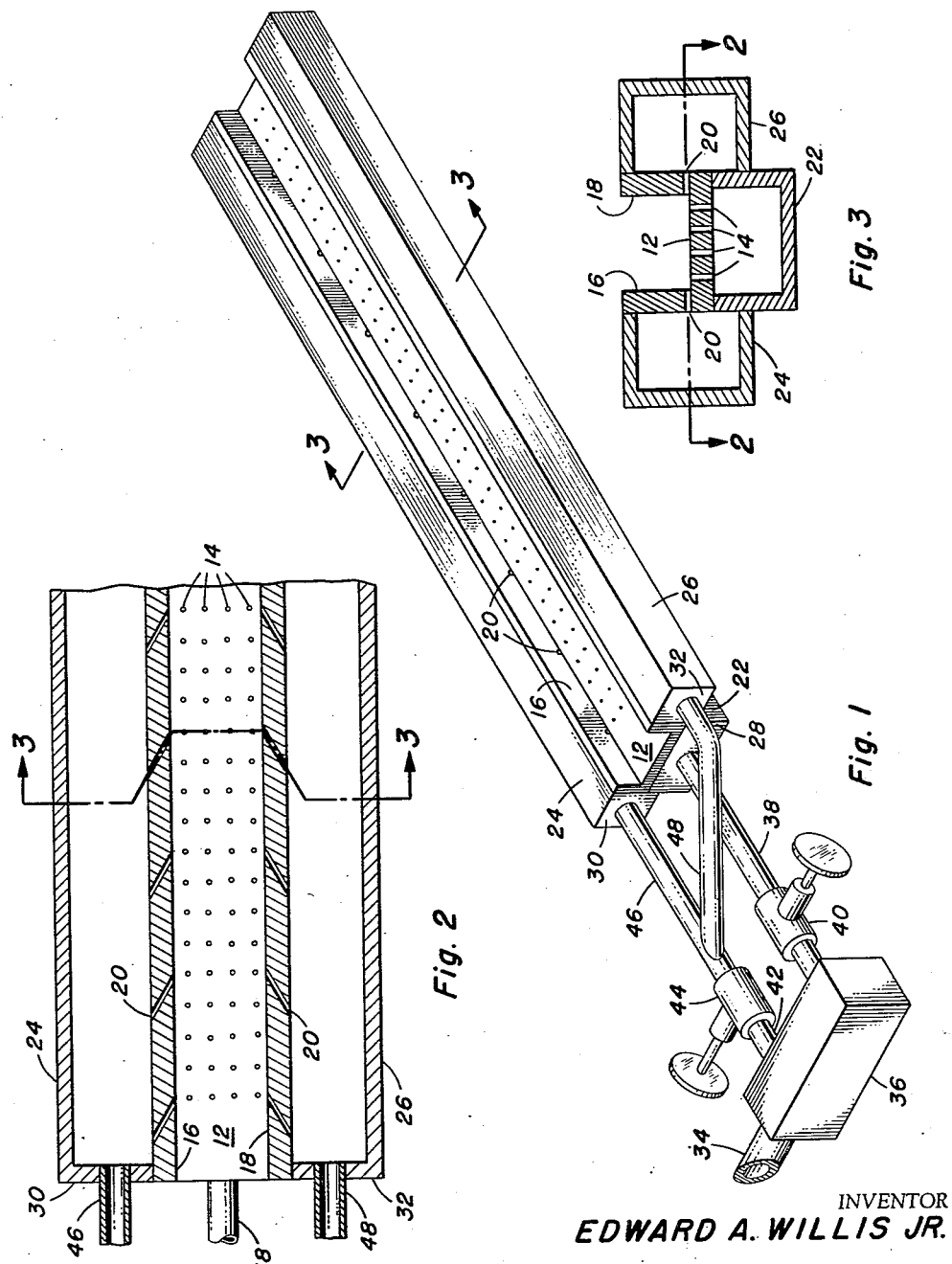
INVENTOR
EDWARD A. WILLIS JR.
BY
ATTORNEYS

2,805,898

FLUID CURRENT CONVEYOR FOR FRAGILE ARTICLES

Edward A. Willis, Jr., Arlington, Va., assignor to the United States of America as represented by the Secretary of the Navy Application January 18, 1955, Serial No. 482,685

7 Claims. (Cl. 302—29)

(Granted under Title 35, U. S. Code (1952), sec. 266)

The invention described herein may be manufactured and used by or for the Government of the United States of America for governmental purposes without the payment of any royalties thereon or therefor.

The present invention relates to a fluid current conveyor for fragile articles and more particularly to a conveyor in which an air cushion is provided between the article and the conveyor.

It is therefore an object of the instant invention to provide an air current conveyor in which the article conveyed does not contact the conveyor.

Another object is to provide a conveyor which will assure the transporting of articles therealong at fairly precise intervals.

A further object of the invention is to provide an air current conveyor in which means are provided whereby the conveyor may be adapted to articles of different size and weight.

Other objects and many of the attendant advantages of this invention will be readily appreciated as the same becomes better understood by reference to the following detailed description when considered in connection with the accompanying drawings wherein:

Fig. 1 shows a perspective view of a preferred embodiment of the invention.

Fig. 2 is a section taken along the line 2—2 of Fig. 3.

Fig. 3 is a section taken along line 3—3 of Figs. 1 and 2.

Referring now to the drawings, wherein like reference characters designate like or corresponding parts throughout the several views, there is shown in Fig. 1 an air current conveyor generally designated at 10 having a bottom plate 12 with numerous holes 14 therein, as shown. Conveyor 10 also has side plates 16 and 18, which may be integral with plate 12, the three plates thus forming a channel. Side plates 16 and 18 have holes 20 therein which are pointed in the general direction of travel of an article along the conveyor. These holes are preferably at a 20° angle to the axis of the conveyor.

Attached to the underside of bottom plate 12 is a three-sided box-like structure 22. Attached to the outer sides of side plates 16 and 18 and to the sides of box 22 are three-sided box-like structures 24 and 26, respectively. These three box-like structures 22, 24 and 26 form air conduits, as may be seen from Fig. 3. The conduits are each closed at each end, end plates 28, 30 and 32 being visible on Fig. 1.

Air is supplied to the conveyor 10 by air inlet pipe 34 which is connected at one end to a small tank 36 and at its other end to a suitable source (not shown) of air under pressure. A first pipe 38 leads from the tank 36 through an end plate 28 on the box-like conduit 22. Pipe 38 has a metering valve 40 therein. A second pipe 42 leads from tank 36, through a metering valve 44: thereafter, it divides into two legs 46 and 48 which lead through end plates 30 and 32, respectively.

In operation, air is supplied to tank 36 through the pipe 34, and is then led by pipes 38 and 42 to the three box-like structures 22, 24 and 26. Air then passes through the holes 14 in bottom plate 12 of the conveyor 10. The pressure of the air, and therefore the velocity of it as it passes through holes 14 is adjusted by the valve 40. Similarly air is conducted through pipe 42 and its legs 46 and 48 to the box-like structures 24 and 26, and then flows through the holes 20. The velocity of the air through holes 20 may be adjusted by the valve 44. It may thus be seen that the air issuing through holes 14 will sustain any article placed in the conveyor 10, and the article will be propelled along by the air issuing from the holes 20. If the articles are placed at the inlet end of the conveyor at regular spaced intervals of time, there will be no friction between the article and the conveyor bottom plate 12, as there will be provided under the article a sustaining cushion of air. Since the flows through the two sets of holes 20 will be equal, the article will not contact the side plates 16 and 18. Since the articles will be out of contact with any solid, their progress along the conveyor 10 will be unvarying. This is particularly necessary where the conveyor 10 is to be used between a first machine which produces articles at a uniform rate and a second machine that must be supplied with the articles at a uniform rate. Also, there is eliminated any danger of breaking the articles in the event they are fragile, as for instance, small, newly made ceramic wafers. By means of the valves 40 and 44, the air flow may be adjusted for articles of different size and weight.

Obviously many modifications and variations of the present invention are possible in the light of the above teachings. It is therefore to be understood that within the scope of the appended claims the invention may be practiced otherwise than as specifically described.

What is claimed is:

1. In a gas current conveyor, a longitudinal, substantially horizontal perforated bottom plate, two side plates disposed adjacent to and on either side of said bottom plate, said plates forming an upwardly facing channel, holes in said side plates, said holes being at a slight angle to the axis of the channel, a box-like structure underlying said bottom plate and forming a conduit therewith, other box-like structures adjacent to said side plates and forming conduits therewith, a tank for gas, a first pipe connecting said tank with the conduit underlying said bottom plate, and a second pipe of forked configuration connecting each of said other conduits with said tank.

2. The apparatus of claim 1, and regulating valves in said pipes.

3. In an air current conveyor, first, second and third longitudinally disposed gas conduits, the axes of said conduits being parallel and substantially horizontal, the axes of the first and second conduit being at approximately one level and the axis of the third conduit being below said level, said third conduit being contiguous with said first and second conduits and said first and second conduits being spaced apart, whereby an upwardly facing channel is formed, upwardly directed holes in the upper wall of said third conduit, holes in said first and second conduit through side walls thereof and opening into said channel, said latter mentioned holes being disposed at less than 90 degrees to the direction of said channel, and means to supply gas under controllable pressure to said conduits.

4. In an air current conveyor, means forming an upwardly facing substantially horizontally extending channel having a bottom and spaced sides, means to direct gas upwardly from said bottom, and means in said sides adjacent the bottom to direct gas generally longitudinally of said channel.

5. In an air current conveyor, means forming an upwardly facing substantially horizontally extending channel having a bottom and spaced sides, means to direct gas upwardly from said bottom, means in said sides adjacent the bottom to direct gas generally longitudinally of said channel, and independently controlled means to supply gas to said latter two mentioned means.

6. In an air current conveyor, a substantially horizontal perforated bottom plate, two side plates disposed adjacent to and on either side of said bottom plate, said plates forming an upwardly facing channel, holes in said side plates adjacent the bottom plate, said holes being at a slight angle to the axis of the channel, means to supply air under pressure to the perforations in said bottom plate, and means to supply air under pressure to said holes, whereby an article-sustaining air cushion will be formed above said bottom plate and whereby the air from said holes in said side plates will propel an article along said channel.

7. The apparatus of claim 6, the bottoms of said holes extending to the bottom plate.

References Cited in the file of this patent

UNITED STATES PATENTS

| | | |
|---|---|---|
| 1,051,905 | McCord | Feb. 4, 1913 |
| 1,971,853 | Thlefeldt | Aug. 28, 1934 |
| 2,527,466 | Townsend | Oct. 24, 1950 |
| 2,708,602 | Galle | May 17, 1955 |

FOREIGN PATENTS

| | | |
|---|---|---|
| 620,724 | Great Britain | Mar. 29, 1949 |